United States Patent Office 3,066,137
Patented Nov. 27, 1962

3,066,137
1-(p-SULFAMYL-PHENYL)-PYRAZOLE DERIVATIVES AND METHOD OF PREPARATION
John B. Bicking, Lansdale, Pa., assignor to Merck & Co., Inc., Rahway, N.J., a corporation of New Jersey
No Drawing. Filed Apr. 6, 1959, Ser. No. 804,136
4 Claims. (Cl. 260—239.9)

This invention relates to novel substituted pyrazole sulfonamides and alkali metal salts thereof, which have the structural formula:

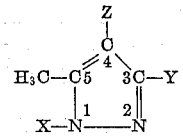

where X is selected from the group consisting of pyridyl, p-sulfamylphenyl and p-carboxyphenyl, Y is selected from the group consisting of methyl and carboxyl, and Z is selected from the group consisting of hydrogen and sulfamyl.

The new compounds in accordance with this invention are useful chemo-therapeutic agents particularly because of their diuretic properties. The compounds can be administered in therapeutic dosages in conventional vehicles as in the form of a tablet, since they are effective when administered orally as well as when injected. Since the alkali metal salts of the compounds of this invention are also readily soluble in an isotonic aqueous medium, injectable solutions can be prepared by dissolving the compound in the selected medium. The alkali metal salts are stable of themselves, although preservatives may be added if desired.

The dosage of the substituted pyrazole sulfonamides may be varied over a wide range and for this reason, scored tablets containing 100, 150, 250 and 500 milligrams of the active ingredient may be made available to the physician for the symptomatic adjustment of the dosage to the individual patient. These dosages are well below the toxic or lethal dose of the compound.

Substituted pyrazole sulfonamides in accordance with this invention are readily prepared by reacting the corresponding 4-unsubstituted pyrazole with chlorosulfonic acid. The resulting sulfonyl chloride is then reacted with ammonia, producing the sulfonamide.

The alkali metal salts of the compounds of this invention are prepared with convenience by dissolving the compounds in an aqueous or alcoholic solution of the selected alkali metal hydroxide and, if desired, isolating the salt by evaporating the solvent. Any of the conventional alkali metal salts, such as sodium, potassium, lithium or the like salts, can be prepared by this method or by any other methods conventionally used and well known to skilled organic chemists.

The preparation of these compounds is more fully described in the following examples. It is to be understood, however, that the examples are illustrative of the methods employed for their preparation and are not to be construed as limiting the invention to the particular reaction conditions specifically described. It is to be noted one of the novel compounds is prepared by reacting a sulfamylphenyl hydrazine with ethyl acetopyruvate to give a pyrazole having a sulfamylphenyl substituent on the 1-nitrogen atom.

EXAMPLE 1

1-(2-Pyridyl)-3,5-Dimethylpyrazole-4-Sulfonamide

Step 1—Preparation of 1-(2-pyridyl)-3,5-dimethylpyrazole.—2-hydrazinopyridine (8.5 g., 0.078 mole) was added to acetylacetone (8.5 g., 0.085 mole) with cooling in a water bath. After 0.5 hour, the mixture was distilled in vacuo to obtain 9.2 g. of product, which had a boiling point of 122° C. at 3 mm. pressure.

An analysis of the product showed that it corresponded closely to the empirical formula $C_{10}H_{11}N_3$, confirming that the compound was 1-(2-pyridyl)-3,5-dimethylpyrazole.

Step 2—Preparation of 1-(2-pyridyl)-3,5-dimethylpyrazole-4-sulfonamide.—A mixture of 7.0 g. (0.04 mole) of 1-(2-pyridyl)-3,5-dimethylpyrazole and 28 g. (0.24 mole) of chlorosulfonic acid was heated 3.5 hours on the steam bath. The mixture was poured on ice and the precipitated sulfonyl chloride was added to 20 cc. of liquid ammonia to give the sulfonamide which had a melting point of 159–160° C., when recrystallized from isopropyl alcohol.

An analysis of the product showed that it corresponded closely to the empirical formula $C_{10}H_{12}N_4O_2S$, confirming that the compound was 1-(2-pyridyl)-3,5-dimethylpyrazole-4-sulfonamide.

EXAMPLE 2

1-(p-Sulfamylphenyl)-3,5-Dimethylpyrazole-4-Sulfonamide 1-(p-sulfamylphenyl)-3,5-dimethylpyrazole was prepared by mixing p-sulfamylphenylhydrazine with an excess of acetylacetone. The product, purified by solution in sodium hydroxide solution and precipitation by acid, had a melting point of 230–232° C. It was used without further purification.

A mixture of 7.5 g. (0.03 mole) of 1-(p-sulfamylphenyl)-3,5-dimethylpyrazole and 17.5 g. (0.15 mole) of chlorosulfonic acid was heated 4 hours on the steam bath. The mixture was poured on ice. Liquid was decanted from the precipitated gum which was then dissolved in concentrated ammonium hydroxide. Acidification after 15 minutes gave the disulfonamide, M.P. 265–267° C. (from water-pyridine mixture).

An analysis of the product showed that it corresponded closely to the empirical formula $C_{11}H_{14}N_4O_4S_2$, confirming that the compound was 1-(p-sulfamylphenyl)-3,5-dimethylpyrazole-4-sulfonamide.

EXAMPLE 3

1-(p-Carboxyphenyl)-3,5-Dimethylpyrazole-4-Sulfonamide

Step 1—Preparation of 1-(p-carboxyphenyl)-3,5-dimethylpyrazole.—p-Carboxyphenylhydrazine (40 g., 0.26 mole) was added to acetylacetone (30 g., .30 mole). After the exothermic reaction was finished, the resulting solid cake was dissolved in sodium bicarbonate solution and the solution acidified to precipitate the product, M.P. 151–153° C. (from dilute acetic acid). An analysis of the product showed that it corresponded closely to the empirical formula $C_{12}H_{21}N_2O_2$, confirming that the compound was 1-(p-carboxyphenyl)-3,5-dimethylpyrazole.

Step 2—Preparation of 1 - (p - Carboxyphenyl) - 3,5 - Dimethylpyrazole-4-Sulfonamide.—A mixture of 6.5 g. (0.03 mole) of 1-(p-carboxyphenyl)-3,5-dimethylpyrazole and 17.5 g. (0.15 mole) of chlorosulfonic acid was heated 3 hours on the steam bath. The solution was poured on ice and the precipitated solid was added to 25 cc. concentrated ammonium hydroxide. After 15 minutes the solution was acidified to precipitate the sulfonamide which when recrystallized from water-ethanol had a melting point of 247–248° C.

An analysis of the product showed that it corresponded closely to the empirical formula $C_{12}H_{13}N_3O_4S$, confirming that the compound was 1-(p-carboxyphenyl)-3,5-dimethylpyrazole-4-sulfonamide.

EXAMPLE 4

*5-Methyl-1-(p-Sulfamylphenyl) Pyrazole - 3 - Carboxylic Acid*

The sodium derivative of ethyl acetopyruvate was prepared according to the procedure described by Marvel and Dreger in "Organic Syntheses," collective volume I, p. 238. This salt (18.0 g., 0.1 mole) was dissolved in 100 cc. of 5% sodium hydroxide solution. After 10 minutes the solution was acidified with concentrated hydrochloric acid and a solution of 18.7 g. (0.1 mole) of p-sulfamylphenylhydrazine in 100 cc. 5% hydrochloric acid was added. The product began to precipitate immediately and when recrystallized from water-isopropyl alcohol had a melting point of 247° C. (decomposition).

An analysis of the product showed that it corresponded closely to the empirical formula $C_{11}H_{11}N_3O_4S$, confirming that the compound was 5-methyl-1-(p-sulfamylphenyl) pyrazole-3-carboxylic acid.

EXAMPLE 5

The product of Example 1 is reacted with an equivalent amount of NaOH, producing the sodium salt of 1-(2-pyridyl)-3,5-dimethylpyrazole-4-sulfonamide.

Activity tests in dogs of this compound revealed the compound to be active at ¼ of the full dose, intravenously, the full dose being conventionally and arbitrarily set at an initial priming dose of 25 milligrams per kilogram of body weight followed by an infusion of 30 mg./kg./hr. The free compound is also active when administered orally, only ¼ of the full dose being required, the full oral dose being 30 mg./kg.

Toxicity tests on mice showed the active dose to be far below the lethal dose.

EXAMPLE 6

Compressed tablet containing 250 milligrams of active ingredient per tablet, in a quantity suitable for fifty tablets:

| | Grams |
|---|---|
| 1 - (p - sulfamylphenyl)-3,5-dimethylpyrazole-4-sulfonamide | 12.500 |
| Calcium phosphate tribasic | 2.095 |
| Methylcellulose 15 cps. 2%, 3 cc | 0.060 |
| Starch paste 10%, 1 part; gelatine solution 20%, 1 part, 3 cc | 0.450 |
| | 15.105 |
| Methylcellulose 15 cps | 0.750 |
| Talc, dried | 0.750 |
| | 16.605 |

1-(p-sulfamylphenyl)-3,5-dimethylpyrazole - 4 - sulfonamide and calcium phosphate tribasic are mixed together and then passed twice through No. 60 bolting cloth. The methylcellulose solution is then added and thoroughly mixed in the granulation and the mixture then passed through a No. 10 screen. The starch-gelatine solution is then added to the granulation, thoroughly mixed, and passed through a No. 10 screen after which the total granulation is oven dried at between about 120 to 130° F. for 16 to 18 hours, and passed through a No. 18 screen. The methylcellulose is passed through a No. 60 bolting cloth onto this granulation and blended thoroughly therewith after which the talc is passed through a No. 60 bolting cloth and also thoroughly mixed with the granulation. The resulting granulation is compressed into tablets having a 13/32" standard curvature punch yielding 50 tablets having a thickness of 0.155 to 0.160 inch, ten of which weigh 3.321 grams. The tablets have a hardness of 5 to 6 kilograms measured by the Monsanto Chemical Company tablet hardness tester apparatus, and a disintegration time of 12 minutes when tested by the U.S.P. tablet disintegrating apparatus (U.S. Pharmacopoeia, 15th edition, p. 937).

EXAMPLE 7

The following is a suitable mixture, showing appropriate quantities per tablet:

| | Mgm. |
|---|---|
| 1-(p-carboxyphenyl) - 3,5 - dimethylpyrazole-4-sulfonamide | 250 |
| Calcium phosphate tribasic | 40 |
| Starch (as 12.5% Starch Paste) | 12.5 |
| Total | 302.5 |

To the foregoing, the following mixture is added:

| | |
|---|---|
| Corn starch | 15 |
| Magnesium stearate | 2.5 |
| Total weight | 320.0 |

The above ingredients are mixed, bolted, and compressed into tablets in substantially the same manner described in Example 6.

EXAMPLE 8

A mixture is prepared as specified in Example 7, using 5 - methyl - 1 - (p-sulfamylphenyl) pyrazole-3-carboxylic acid in place of 1-(p-carboxyphenyl)-3,5-dimethylpyrazole-4-sulfonamide.

EXAMPLE 9

The compounds prepared in accordance with Examples 1-4 are listed in the following table, together with their activities I.V. and the $LD_{50}$ for each.

| Compound | Effective Dose (I.V.) | $LD_{50}$ |
|---|---|---|
| 1-(2-pyridyl)-3,5-dimethyl pyrazole-4-sulfonamide | ¼ | >600 |
| 1-(p- sulfamylphenyl)- 3,5-dimethylpyrazole-4-sulfonamide | ¼ | 162 |
| 1-(p- carboxyphenyl)-3,5- dimethylpyrazole-4-sulfonamide | ⅒ | >600 |
| 5- methyl- 1- (p- sulfamylphenyl) pyrazole- 3-carboxylic acid | ¼ | ---------- |

The activity tests reported in the above table represent that part of a full dose at which the compound was active. A full dose is conventionally and arbitrarily set at an initial priming dose of 25 milligrams per kilogram of body weight followed by an infusion of 30 mg./kg./hr. The activity tests were run in dogs, and the $LD_{50}$ were determined in mice.

EXAMPLE 10

*1,3,5-Trimethylpyrazole-4-Sulfonamide*

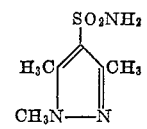

1,3,5-trimethylpyrazole (9.3 g., 0.085 mole) was added dropwise during 10 minutes to 17.6 g. (0.15 mole) of chlorosulfonic acid. The mixture was heated on the steam bath for 1.5 hours and then poured on ice. The precipitated sulfonyl chloride was collected and converted to the sulfonamide by being added to 20 cc. of concentrated ammonium hydroxide. The sulfonamide when recrystallized from water-isopropyl alcohol had a melting point of 201–202° C.

An analysis of the product showed that it corresponded closely to the empirical formula $C_6H_{11}N_3O_2S$, confirming that the compound was 1,3,5-trimethylpyrazole-4-sulfonamide.

EXAMPLE 11

*4-Dipropylsulfamyl-1,3,5-Trimethylpyrazole*

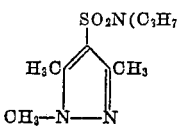

The sulfonyl chloride obtained as above was added to a solution of an excess of dipropylamine in acetone. The sulfonamide so obtained had a melting point of 36–37° C. when recrystallized from a mixture of benzene and petroleum ether.

An analysis of the product showed that it corresponded closely to the empirical formula $C_{12}H_{13}N_3O_2S$, confirming that the compound was 4-dipropylsulfamyl-1,3,5-trimethylpyrazole.

EXAMPLE 12

*1-(3,5-Dimethyl-4-Pyrazolesulfonyl) Piperidine*

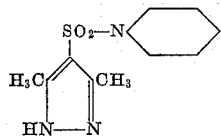

3,5-dimethylpyrazole (9.6 g., 0.1 mole) was added to 58.5 g. chlorosulfonic acid with ice-bath cooling. The mixture was then heated 3 hours on the steam bath. The mixture was cooled and poured on ice and the solid which separated was added to a solution of 10 g. of piperidine in 50 cc. of ether. The solution was extracted with 5% sodium hydroxide solution. The extract was acidified to precipitate the product which when recrystallized from a benzene-cyclohexane mixture had a melting point of 118–119° C.

The analysis corresponds closely to an empirical formula of $C_{10}H_{17}N_3O_2S$, confirming the product to be the compound named.

While the above examples have described the preparation of certain specific compounds and a certain specific dosage form suitable for administering the novel compound of this invention in human therapy, it is to be understood that the invention is not to be limited by these examples or by the specific reaction conditions described for the preparation of the compounds or by the specific ingredients included in the pharmaceutical preparation. On the contrary, it is understood that this invention embraces variations and modifications, including the use of equivalent methods of preparation. However, it is also to be understood that this invention is specifically limited to the compounds defined in the claims and does not extend to the substitution of any other groups for those which are specifically defined in the claims.

Having thus described my invention, I claim:

1. 1-(p-sulfamylphenyl)-3,5-dimethylpyrazole-4-sulfonamide.
2. 5-methyl-1-(p-sulfamylphenyl) pyrazole-3-carboxylic acid.
3. In a method of producing 1-(p-sulfamylphenyl)-3,5-dimethylpyrazole-4-sulfonamide, the steps which comprise mixing p-sulfamylphenylhydrazine with an excess of acetylacetone, precipitating by cooling the resulting 1-(p-sulfamylphenyl)-3,5-dimethylpyrazole, heating the resulting pyrazole with chlorosulfonic acid and combining the resulting sulfonyl chloride with ammonia.
4. In a method of preparing 5-methyl-1-(p-sulfamylphenyl) pyrazole-3-carboxylic acid, the steps which comprise combining the sodium derivative of ethyl acetopyruvate with p-sulfamylphenylhydrazine and separating the resulting precipitated product from the solution.

References Cited in the file of this patent

UNITED STATES PATENTS

| | | |
|---|---|---|
| 2,510,726 | Sundholm | June 6, 1950 |
| 2,879,174 | Wagner et al. | Mar. 24, 1959 |

FOREIGN PATENTS

| | | |
|---|---|---|
| 754,660 | Great Britain | Aug. 8, 1956 |

OTHER REFERENCES

Crippa et al.: Farmaco (Pavia) Ed. Sci., vol. 10, pp. 691–8 (1955).